United States Patent
Nakada et al.

(10) Patent No.: US 8,421,423 B2
(45) Date of Patent: Apr. 16, 2013

(54) OUTPUT CONTROL APPARATUS OF GENERATOR

(75) Inventors: Yasuhiro Nakada, Saitama (JP); Minoru Maedako, Saitama (JP); Kenji Kamimura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 343 days.

(21) Appl. No.: 12/872,554

(22) Filed: Aug. 31, 2010

(65) Prior Publication Data

US 2011/0068752 A1 Mar. 24, 2011

(30) Foreign Application Priority Data

Sep. 24, 2009 (JP) ................. P2009-219613

(51) Int. Cl.
*H02P 9/00* (2006.01)
*H02P 11/00* (2006.01)
*H02H 7/06* (2006.01)

(52) U.S. Cl.
USPC ............... 322/45; 322/44; 322/28

(58) Field of Classification Search ......... 322/28, 322/44, 45
See application file for complete search history.

(56) References Cited

U.S. PATENT DOCUMENTS

| | | | | | |
|---|---|---|---|---|---|
| 3,678,352 | A | * | 7/1972 | Bedford | 318/400.41 |
| 3,945,362 | A | * | 3/1976 | Neuman et al. | 123/606 |
| 4,141,231 | A | * | 2/1979 | Kudlich | 68/205 R |
| 4,200,832 | A | * | 4/1980 | Johansson et al. | 322/59 |
| 4,282,471 | A | * | 8/1981 | Budniak et al. | 318/685 |
| 4,524,350 | A | * | 6/1985 | Eccleston | 340/572.2 |
| 4,535,281 | A | * | 8/1985 | Shimizu et al. | 322/28 |
| 4,642,537 | A | * | 2/1987 | Young | 318/400.35 |
| 4,755,737 | A | * | 7/1988 | Komurasaki et al. | 322/99 |
| 5,003,938 | A | * | 4/1991 | Erickson et al. | 123/90.14 |
| 5,029,516 | A | * | 7/1991 | Erickson et al. | 91/459 |
| 5,294,879 | A | * | 3/1994 | Freeman et al. | 322/23 |
| 5,923,142 | A | * | 7/1999 | Li | 318/701 |
| 6,390,036 | B1 | * | 5/2002 | Yuuki | 123/90.11 |
| 7,911,188 | B2 | * | 3/2011 | Wada et al. | 322/44 |
| 8,050,845 | B2 | * | 11/2011 | Katsura | 701/103 |
| 8,132,556 | B2 | * | 3/2012 | Glugla et al. | 123/406.11 |
| 2005/0151515 | A1 | | 7/2005 | Isurin et al. | 322/28 |
| 2008/0191482 | A1 | | 8/2008 | Okuno | 290/7 |
| 2009/0281707 | A1 | * | 11/2009 | Katsura | 701/103 |
| 2010/0057324 | A1 | * | 3/2010 | Glugla et al. | 701/102 |
| 2010/0072958 | A1 | * | 3/2010 | Wada et al. | 322/22 |
| 2011/0089910 | A1 | * | 4/2011 | Nakada et al. | 322/28 |
| 2012/0150415 | A1 | * | 6/2012 | Glugla et al. | 701/102 |
| 2012/0161680 | A1 | * | 6/2012 | Kitagawa | 318/400.04 |

FOREIGN PATENT DOCUMENTS

EP 0373670 B1 6/1990
JP 6276800 A 9/1994
(Continued)

*Primary Examiner* — Pedro J Cuevas
(74) *Attorney, Agent, or Firm* — Arent Fox LLP

(57) ABSTRACT

A generator (100) includes a generator winding (103) and an excitation winding (104), and a field winding (102). To converge an output voltage of the generator winding (103) to a target, a field current is varied by increasing/decreasing an energization duty ratio of a switching device (110) connected to the field winding (102). In a duty ratio zero determination unit (2) and a duty ratio zero continuation determination unit (3), when an output duty ratio continues for a predetermined time with duty ratio zero, a duty ratio increase amount restriction unit (4) restricts an upper limit of the duty ratio to a predetermined upper limit when the field current increases. A duty ratio restriction unit (21*a*) for restricting the duty ratio by a maximum value determined based on a voltage of a smoothing capacitor (113) in place of the determination of the duty ratio being zero may be provided.

3 Claims, 8 Drawing Sheets

FOREIGN PATENT DOCUMENTS

| | | |
|---|---|---|
| JP | 3043566 B2 | 9/1995 |
| JP | 7245995 A | 9/1995 |
| JP | 8-140400 A | 5/1996 |
| JP | 2996574 B2 | 10/1999 |

* cited by examiner

| VOLTAGE DIFFERENCE [V] | 0 | 1 | 2 | 3 | 4 | 5 | 6 | 7 | 8 | 9 | 10 | 11 |
|---|---|---|---|---|---|---|---|---|---|---|---|---|
| MAXIMUM VALUE OF DUTY RATIO [%] | 2 | 3.5 | 5 | 6 | 7 | 8 | 9 | 9 | 9 | 10 | 10 | 10 |

| SMOOTHING CAPACITOR VOLTAGE [V] | 150 OR LESS | 160 | 170 | 180 | 190 | 200 | 210 OR HIGHER |
|---|---|---|---|---|---|---|---|
| MAXIMUM VALUE OF DUTY RATIO [%] | NO RESTRICTION | 10 | 6 | 5 | 4 | 3 | 2 |

PRIOR ART

OUTPUT CONTROL APPARATUS OF GENERATOR

TECHNICAL FIELD

The invention relates to an output control apparatus of a generator and more particularly to an output control apparatus of a generator having a stabilization unit of an output voltage in consideration of an influence of a magnetizing action when a phase advance load is connected.

BACKGROUND ART

An automatic voltage regulator (hereinafter, also called "AVR") is known which keeps a voltage output from a generator winding to a previously set voltage by controlling a current supplied to a field winding by a voltage generated to an excitation winding.

FIG. 10 shows a prior art of an alternating generator having an AVR. In FIG. 10, the generator 100 has a field winding 102, a generator winding 103, and an excitation winding 104. A permanent magnet 106 is disposed to a rotor 105 around which the field winding 102 is wound. A rectifier 108, a voltage detection circuit 109, and a transistor 110 are provided in the AVR 107. An output side of the rectifier 108 is connected to the field winding 102 through a brush 111, and a flywheel diode 112 and a smoothing capacitor 113 are connected in parallel with the field winding 102. The excitation winding 104 is connected to an input side of the rectifier 108. The rotor 105 is rotated by a drive source such as an engine (not shown).

In FIG. 10, when the rotor 105 is rotated by the drive source, a current is generated to the excitation winding 104 by a fluctuation of a magnetic flux of the permanent magnet 106 cutting across the excitation winding 104. The current is rectified by the rectifier 108 and supplied to the field winding 102 as a direct exciting current. The voltage detection circuit 109 compares a voltage value representing an output voltage of the generator winding 103 with a preset voltage value (target voltage) and turns on and off the transistor 110 depending on whether the output voltage is larger or smaller than the target voltage. When the transistor 110 is turned on, a current flows to the field winding 102 and an output of the generator winding 103 is increased, whereas when the transistor 110 is turned off, no current flows to the field winding 102 and the output of the generator winding 103 is decreased. An output of the generator 100 is kept constant by a repetition of the on/off operation of the transistor 110, that is, by a control of an on/off duty ratio of the transistor. An alternating generator having the AVR as described above is described in, for example, Patent Documents 1, 2, 3, and the like.

CITATION LIST

Patent Documents

Patent Document 1 Japanese Patent Application Laid-open No. 8-140400
Patent Document 2 Japanese Patent No. 2996574
Patent Document 3 Japanese Patent No. 3043566

SUMMARY OF INVENTION

Technical Problem

An increase/decrease amount of a direct exciting current supplied to the field winding 102 from the excitation winding 104 is determined based on a value obtained by multiplying a feedback coefficient Kp to a value obtained by subtracting a detected value of an output voltage (detected voltage value) from a target voltage value. That is, the increase/decrease amount is determined as "current increase/decrease amount= (target voltage value−detected voltage value)×Kp".

According to the calculation formula, when an excessively small value is selected as the coefficient Kp, a time is consumed until an output voltage generated by the generator winding 103 is corrected to the target voltage, whereas when an excessively large value is selected as the coefficient Kp, the output voltage may be oscillated and may be not converged. Accordingly, it is required to select an appropriate coefficient Kp in consideration of response delays and the like of the excitation winding 104 and the generator winding 103.

Further, an actual field current is controlled by a unit time of the energization control element (transistor) 110, that is, by an energization time ratio per a predetermined one cycle (duty ratio). When a pulse cycle of a rectangular wave is shown by T and an on-time width in the pulse cycle is shown by t, the duty ratio is defined by a duty ratio=t/T×100%. Then, the duty ratio, a field current, a voltage of a smoothing capacitor (shown by reference numeral 113 of FIG. 10), and the number of rotation of the rotor (number of rotor revolutions) have the following relation.

output voltage ∝ (field current×number of rotor revolutions) ∝ (duty ratio×smoothing capacitor voltage× number of rotor revolutions)

Accordingly, assuming that the number of rotor revolutions is constant, a higher smoothing capacitor voltage more decreases a duty ratio necessary to keep the output voltage constant.

When an electric load connected to the generator 100 is a phase advance load such as a capacitor, since a direction of a magnetic flux generated by a field current coincides with a direction of a magnetic flux generated by a load current, a magnetic flux cutting across the generator winding 103 increases so that a magnetizing action, by which a dielectric electro-motive force of the generator winding 103 is increased, is generated. Since the magnetizing action is generated not only to the generator winding 103 but also to the excitation winding 104, the phase advance load has a trend to have higher smoothing capacitor than that when a resistance load having capacity identical with that of the phase advance load is connected to the generator 100.

When the smoothing capacitor voltage is increased, the duty ratio is decreased to keep the output voltage constant as apparent from the relation between the smoothing capacitor voltage and the duty ratio. That is, the output voltage is often controlled at the duty ratio being around 0%. In a state that the output voltage is controlled while varying the duty ratio in a range including 0%, the duty ratio is not decreased to below 0% even if the output voltage is decreased. Accordingly, an output voltage decreasing action is suppressed to a small degree, whereas an output voltage increasing action may excessively increase the duty ratio, and thus a variation of the output voltage cannot be balanced. Thus, since an output voltage may be largely varied in the AVR according to the conventional technique, a solution of the large variation of the output voltage is a problem to be solved.

To solve the problem, an object of the invention is to provide an output control apparatus of a generator capable of stabilizing an output voltage even when a phase advance load is connected to the generator.

Solution to Problem

The present invention has a first feature in that an output control apparatus of a generator including a generator winding and an excitation winding wound around a stator, a field winding wound around a rotor rotated by a drive source, and a rectifier for rectifying a current generated by the excitation winding and supplying the rectified current to the field winding, the output control apparatus of a generator, comprising: a field current control unit which increases/decreases an energization current of the field winding by increasing/decreasing an energization time ratio in an energization cycle of a switching device for controlling an energization of the field winding to converge an output voltage of the generator winding to a target voltage value; an energization time ratio zero detection unit which detects whether the energization time ratio include a zero; and an energization time ratio restriction unit which restricts an upper limit value of the energization time ratio at a time when a field current in the field current control unit increases to a predetermined upper limit value when the energization time ratio zero detection unit detects that the energization time ratio includes the zero.

The present invention has a second feature in comprising an energization time ratio zero continuation determination unit which drives the energization time ratio restriction unit when a time during which the energization time ratio includes the zero is continued for a predetermined time or longer.

The present invention has a third feature in that an output control apparatus of a generator including a generator winding and an excitation winding wound around a stator, a field winding wound around a rotor rotated by a drive source, and a rectifier for rectifying a current generated by the excitation winding and supplying the rectified current to the field winding, the output control apparatus of a generator, comprising: a smoothing capacitor disposed in parallel with the field winding; a field current control unit which increases/decreases an energization current of the field winding by increasing/decreasing an energization time ratio in an energization cycle of a switching device for controlling an energization of the field winding to converge an output voltage of the generator winding to a predetermined voltage value; a capacitor voltage detection unit which detects a terminal voltage of the smoothing capacitor; and an energization time ratio restriction unit which restricts an upper limit value of an energization time ratio by a maximum value determined so that the energization time ratio is made smaller when a capacitor voltage is higher corresponding to the capacitor voltage detected by the capacitor voltage detection unit when a field current is increased by the field current control unit.

Advantageous Effects of Invention

When a phase advance load is connected, an energization time ratio, i.e., a duty ratio of a switching element may be controlled around zero. According to the invention having a first feature, the upper limit of the duty ratio can be restricted when the duty ratio includes zero, and a field current is not controlled by an extremely large duty ratio even when the difference of output voltage and target voltage is large. Thereby, in the state of control containing the duty ratio zero, a large change of a duty ratio can be avoided and control of the stable output voltage is performed.

According to the invention having a second feature, the upper limit of the duty ratio can be restricted only when it is securely determined that a control including the duty ratio being zero is executed based on that the duty ratio being zero is continued for a certain degree of time.

According to the invention having a third feature, the duty ratio, which is output by selecting a maximum value so that the duty ratio is made smaller when a smoothing capacitor has a higher voltage in response to the voltage of the smoothing capacitor, can be restricted in view of a phenomenon that when a phase advance load is connected, the voltage of the smoothing capacitor tends to increase as compared with a voltage when a resistance load is connected. Thus, even when the phase advance load is connected, a large variation of the duty ratio can be avoided and a stable output voltage can be obtained.

DESCRIPTION OF EMBODIMENTS

Figures 1, 2:
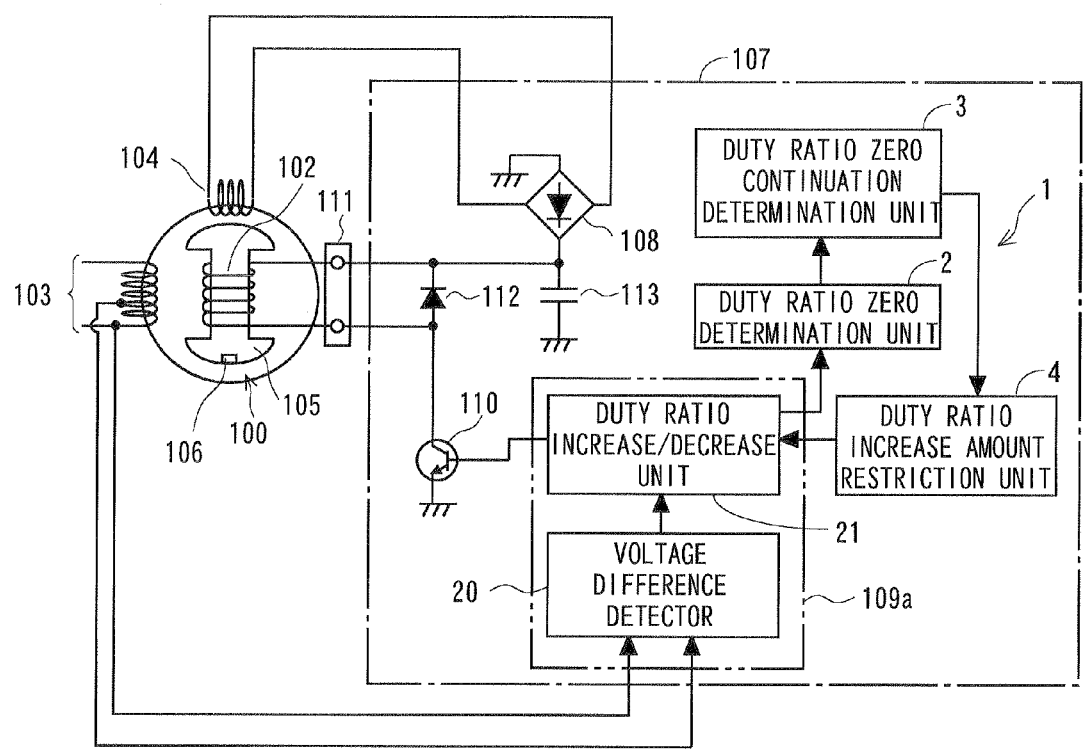
FIG. 1 is a block view showing a system configuration of a generator including an output control apparatus according to an embodiment of the invention.
FIG. 2 is a view showing an example of a correspondence table of a voltage difference used to restrict a duty ratio and the maximum value of a duty ratio.

An embodiment of the invention will be described below referring to the drawings. FIG. 1 shows a system configuration of a generator including an output control apparatus according to an embodiment of the invention. In FIG. 1, the same reference numerals as those of FIG. 10 denote the same portions or equivalent portions. In FIG. 1, an AVR 107 of a generator 100 further includes a phase advance load state discrimination unit 1 in addition to the components shown in FIG. 10. The phase advance load state discrimination unit 1 includes a duty ratio zero determination unit 2, a duty ratio zero continuation determination unit 3, and a duty ratio increase amount restriction unit 4.

A voltage detection circuit 109a has a voltage difference detection unit 20 for comparing a voltage showing an output voltage of a generator winding 103 (hereinafter, called "output voltage") with a target voltage and detecting a voltage difference between the output voltage and the target voltage and a duty ratio increase/decrease unit 21 for increasing/decreasing a duty ratio of a transistor 110 depending on the voltage difference.

When the duty ratio becomes zero as a result that the duty ratio increase/decrease unit 21 increases/decreases the duty ratio by comparing the output voltage of the generator winding 103 with the target voltage, that is, when a PWM output is stopped, the duty ratio zero determination unit 2 generates a duty ratio zero signal, and the duty ratio zero signal is input to the duty ratio zero continuation determination unit 3. The duty ratio zero continuation determination unit 3 measures a continuation time of the duty ratio zero, that is, a stop continuation time of the PWM output according to the input of the duty ratio zero signal, and when the stop continuation time becomes equal to or longer than a predetermined time, the duty ratio zero continuation determination unit 3 inputs a determination signal to the duty ratio increase amount restriction unit 4. The duty ratio increase amount restriction unit 4 inputs a duty ratio increase amount restriction signal to the duty ratio increase/decrease unit 21 of the voltage detection circuit 109a in response to the determination signal.

Whether the duty ratio zero continuation determination unit 3 is provided can be arbitrary selected. When the duty ratio zero continuation determination unit 3 is not provided and the duty ratio zero determination unit 2 determines that the output duty ratio includes a zero, the duty ratio zero determination unit 2 may input the duty ratio increase amount restriction signal to the duty ratio increase/decrease unit 21 at once.

The duty ratio increase/decrease unit 21 restricts the maximum value of a duty ratio to a predetermined value according to the duty ratio increase amount restriction signal. The maximum value of the duty ratio is a value preset according to a difference between the output voltage of the generator winding 103 and the target voltage (refer to FIG. 2). At a time the duty ratio reaches the maximum value, an increase of the duty ratio is restricted.

The duty ratio increase/decrease unit 21 executes a control to restrict the duty ratio maximum value to a duty ratio increase amount restriction value in order to determine the duty ratio in a range between the restricted maximum value and the duty ratio zero, to turn on and off the transistor 110 according to the duty ratio, and to converge the output voltage to the target voltage.

The voltage detection circuit 109a and the phase advance load state discrimination unit 1 can be entirely or partly configured of a microcomputer.

FIG. 2 is a view showing an example of a correspondence between the voltage difference, and the maximum value of the duty ratio, which is used to restrict the duty ratio by the duty ratio increase/decrease unit 21. The duty ratio increase/decrease unit 21 determines the maximum value of the duty ratio according to a regulation of FIG. 2 based on the difference between the output voltage of the generator winding 103 and the target voltage. When, for example, the voltage difference changes in a range from a 0 bolt to 11 bolts, the maximum value of the duty ratio is changed in a range from 2% to 10% depending on the change of the voltage difference.

Figure 3:
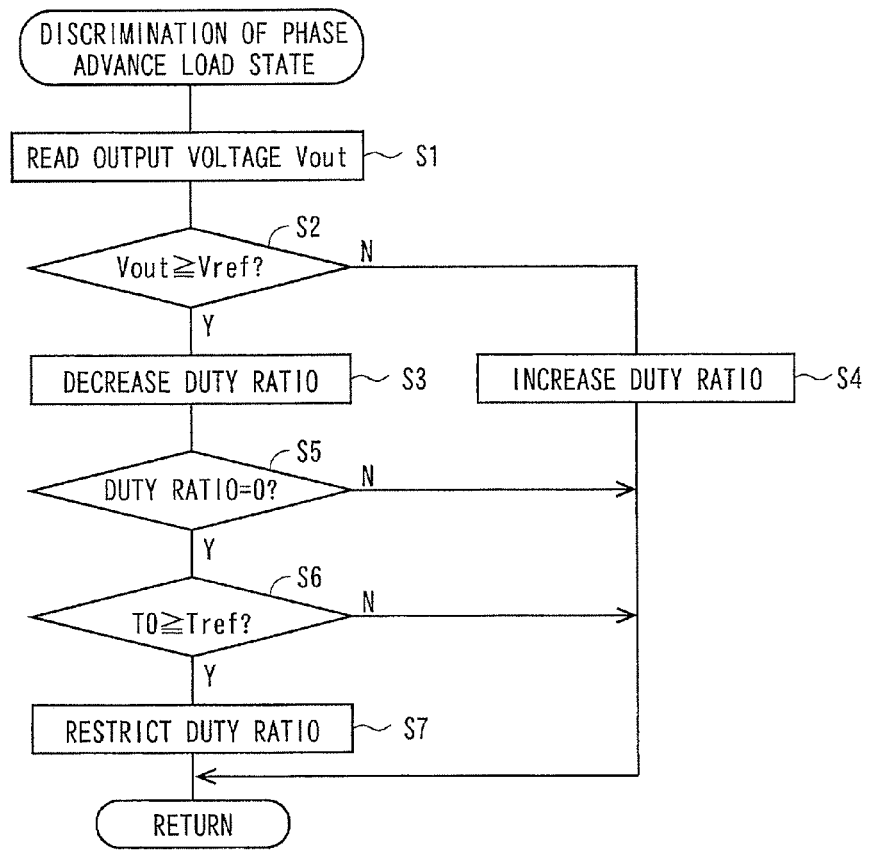
FIG. 3 is a flowchart showing operations of main components of a voltage detection circuit and a phase advance load state discrimination unit.

FIG. 3 is a flowchart showing operations of main components of the voltage detection circuit 109a and the phase advance load state discrimination unit 1. In FIG. 3, in step S1, an output voltage Vout of the generator 100 is inputted to a voltage difference detector 20. In step S2, the output voltage Vout is compared with the target voltage Vref by the voltage difference detector 20. When it is determined that the output voltage Vout is equal to or larger than the target voltage Vref in step S2, a process advances to step S3 where the duty ratio is decreased by the duty ratio increase/decrease unit 21.

In contrast, when it is determined that the output voltage Vout is not equal to or larger than the target voltage Vref in step S2, the process advances to step S4 where the duty ratio is increased by the duty ratio increase/decrease unit 21. An increase/decrease amount of the duty ratio, which is increased/decreased by an operation executed once, is a preset value.

After the duty ratio is decreased in step S3, whether the duty ratio is zero is determined by the duty ratio zero determination unit 2 in step S5. When it is determined that the duty ratio is zero, the process advances to step S6 and whether a continuation time T0 of the duty ratio zero becomes equal to or larger than a predetermined discrimination fixing time Tref is determined by the duty ratio zero continuation determination unit 3. When the determination is affirmative, the process advances to step S7 where the duty ratio is restricted to the maximum value (refer to FIG. 2).

After processing in step S3 as well as when the determinations in steps S5 and S6 are negative, the process returns to step S1, respectively.

A modification of the phase advance load state discrimination unit 1 will be described. As described above, a voltage of the smoothing capacitor 113 included in a circuit of FIG. 1 is increased by a magnetizing action generated in response to a phase advance load capacity. Thus, a phase advance load state is detected based on a voltage value of the smoothing capacitor 113, and when a field current is increased in the state with advance load, the duty ratio maximum value is restricted. With this operation, hunting of the output voltage by repeatedly stopping and starting the field current around the duty ratio being zero can be prevented.

Figure 4:
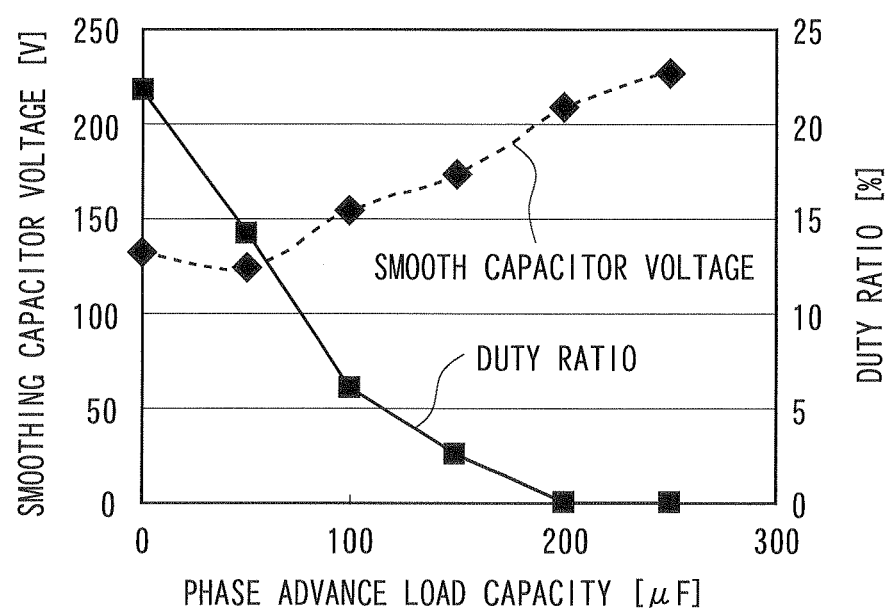
FIG. 4 is a view showing a relation between a phase advance load capacity and a smoothing capacitor voltage.

FIG. 4 is a view showing a relation between the phase advance load capacity and the voltage of the smoothing capacitor 113. FIG. 4 shows also the maximum value of the duty ratio corresponding to the smoothing capacitor 113. The voltage of the smoothing capacitor shows a phenomenon that it is more increased depending on an increase of the phase advance load capacity. Then, the duty ratio is decreased to obtain a predetermined output voltage in response to an increase of the voltage of the smoothing capacitor 113.

Figures 5, 6:
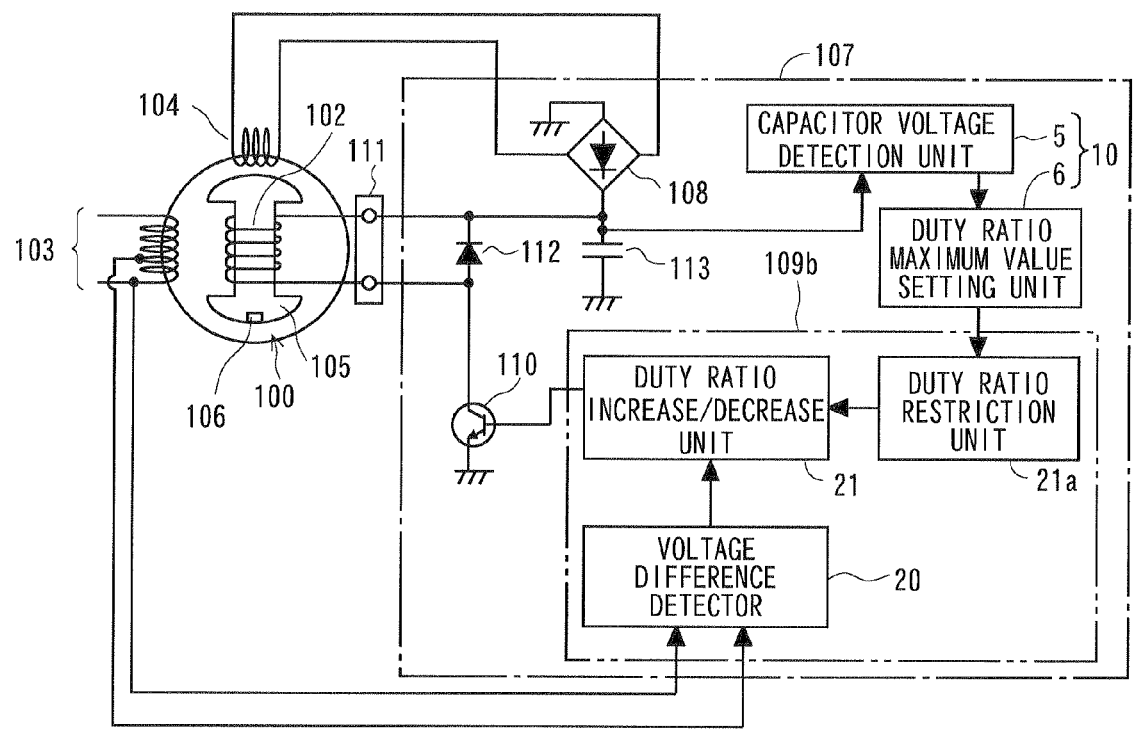
FIG. 5 is a block diagram showing a system configuration of a generator according to a second embodiment of the invention.
FIG. 6 is a view showing an example of a correspondence table of a smoothing capacitor voltage and the maximum value of a duty ratio.
Figure 10:
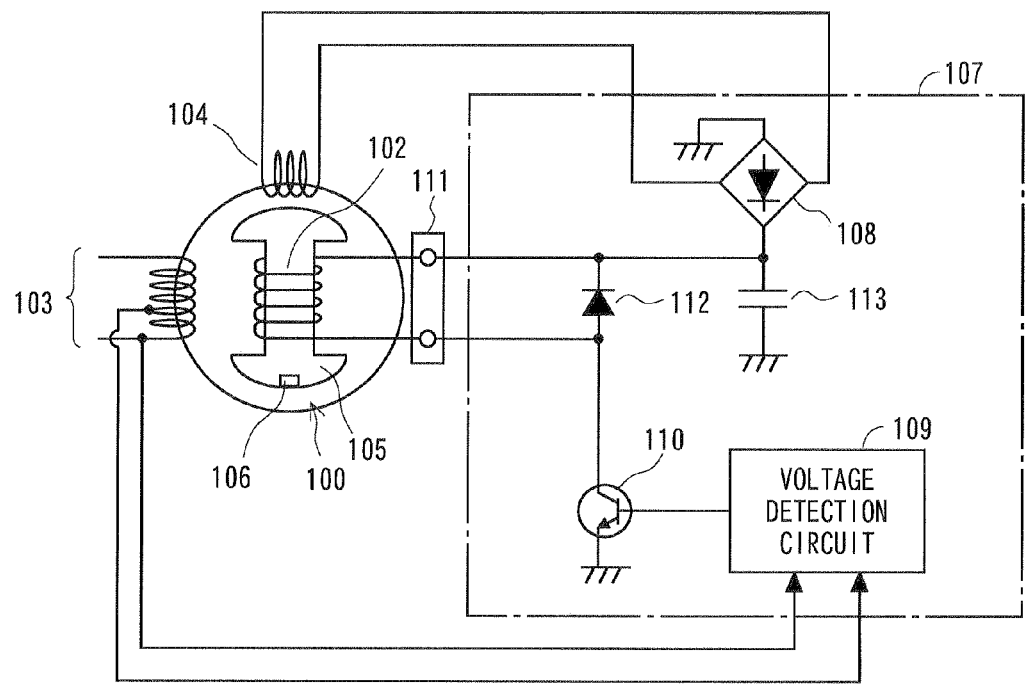
FIG. 10 is a main component configuration view of an alternating generator having a conventional AVR.

FIG. 5 is a system configuration view of a generator having an output voltage control apparatus according to a second embodiment of the invention, and the same reference numerals as those of FIG. 10 show the identical components or equivalent components. In FIG. 5, a phase advance load state discrimination unit 10 has a capacitor voltage detection unit 5 for detecting a voltage Vex of a smoothing capacitor 113 and a duty ratio maximum value setting unit 6 for setting a predetermined maximum value of the duty ratio in response to the voltage Vex of the smoothing capacitor 113 detected by the capacitor voltage detection unit 5.

A voltage detection circuit 109b has a voltage difference detector 20 for comparing an output voltage of a generator winding 103 with a target voltage and detecting a voltage difference between the output voltage and the target voltage and a duty ratio increase/decrease unit 21 for increasing/decreasing a duty ratio of a transistor 110 in response to the voltage difference. The voltage detection circuit 109b further includes a duty ratio restriction unit 21a. The duty ratio restriction unit 21a compares a duty ratio, which is output from the duty ratio increase/decrease unit 21, with the maximum value of a duty ratio, and when the output duty ratio is larger than the maximum value of the duty ratio, the duty ratio restriction unit 21a restricts the output duty ratio to the maximum value of the duty ratio.

The voltage detection circuit 109a and the phase advance load state discrimination unit 10 can be entirely or partly configured of a microcomputer.

FIG. 6 is a view showing an example of a correspondence table of a voltage of a smoothing capacitor used to restrict a duty ratio by the duty ratio increase/decrease unit 21a and the maximum value of the duty ratio. The duty ratio maximum value setting unit 6 determines the maximum value of the duty ratio according to setting described in FIG. 6 in response to a voltage detected by the capacitor voltage detection unit 5. When, for example, a capacitor voltage Vex is 150 bolts or less, the duty ratio to be output is not restricted, and, in a range of the capacitor voltage Vex from 160 bolts to 200 bolts, the maximum value of the duty ratio is decreased in a range from 10% to 3% depending on an increase of the capacitor voltage Vex. Further, when the capacitor voltage Vex is 210 bolts or higher, the duty ratio maximum value is set to 2%.

Figure 7:
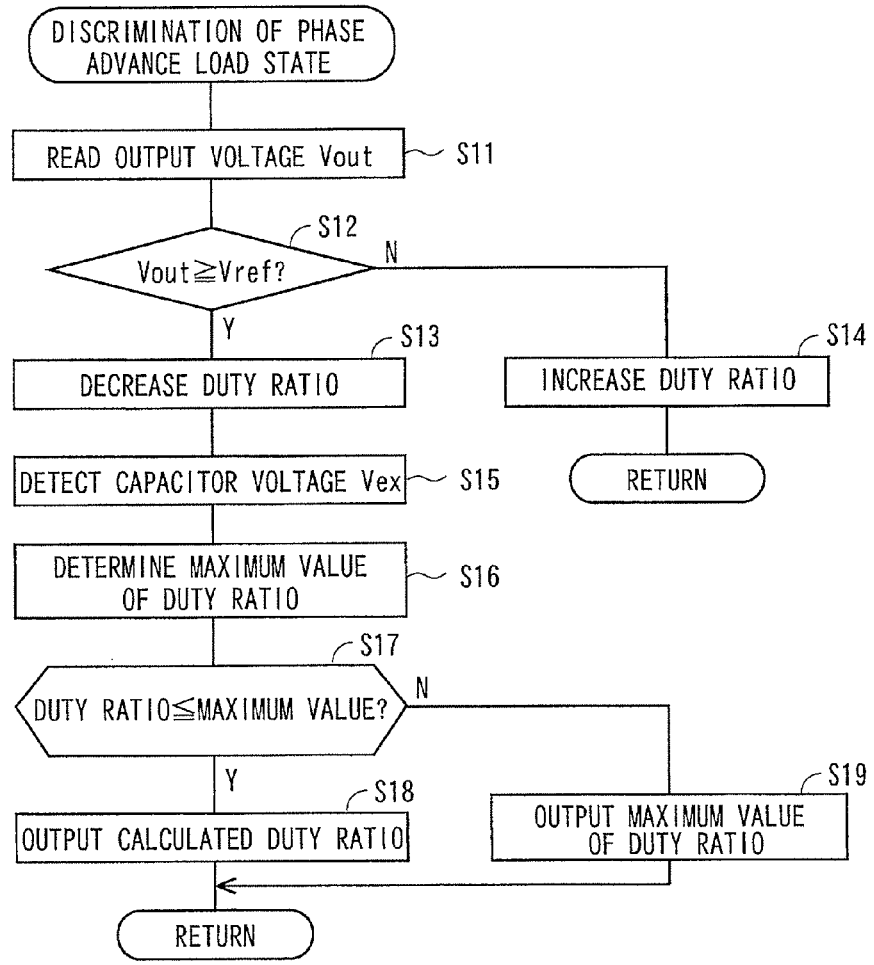
FIG. 7 is a flowchart showing operations of main components of a voltage detection circuit and a phase advance load state discrimination unit according to the second embodiment.

FIG. 7 is a flowchart showing operations of main components of a voltage detection circuit 109 and a phase advance load state discrimination unit 10 according to the second embodiment. In FIG. 7, in step S11, an output voltage Vout of a generator 100 is inputted to a voltage difference detector 20. In step S12, the output voltage Vout is compared with a target voltage Vref by the voltage difference detector 20. When it is determined in step S12 that the output voltage Vout is equal to or larger than the target voltage Vref, a process advances to step S13 and decreases the duty ratio by a duty ratio increase/decrease unit 21. When it is determined that the output voltage Vout is not equal to or larger than the target voltage Vref in step S12, the process advances to step S14 where the duty ratio is increased by the duty ratio increase/decrease unit 21.

An increase/decrease amount of the duty ratio is determined corresponding to a difference between the output voltage Vout and the target voltage Vref. That is, when the output voltage Vout is less than the target voltage Vref, the duty ratio, which is increased corresponding to a difference between the output voltage Vout and the target voltage Vref, is calculated as an output duty ratio, whereas when the output voltage Vout is larger than the target voltage Vref, the duty ratio, which is decreased in response to the difference between the output voltage Vout and the target voltage Vref, is output.

After the duty ratio is decreased in step S13, the voltage Vex of the smoothing capacitor is detected by the capacitor voltage detection unit 5 in step S15. In step S16, the maximum value of a duty ratio, which corresponds to the voltage Vex of the smoothing capacitor, is determined by a function of the duty ratio maximum value setting unit 6 referring to FIG. 6 and set to the duty ratio increase/decrease unit 21.

In step S17, the duty ratio increase/decrease unit 21 determines whether the output duty ratio is equal to or less than the maximum value of the duty ratio. When the output duty ratio is equal to or less than the duty ratio maximum value, the process advances to step S18 where the output duty ratio determined based on the comparison of the output voltage Vout with the target voltage value Vref is output.

In contrast, when it is determined that the output duty ratio is not equal to or less than the maximum value of the duty ratio, the process advances to step S19 where the duty ratio maximum value is output as the output duty ratio.

In the second embodiment, although the increase/decrease amount of the duty ratio is determined corresponding the difference between the target voltage Vref and the output voltage Vout, the duty ratio may be increased/decreased stepwise using an increase/decrease amount of the duty ratio of each one time as a preset amount as in the first embodiment. In this case, it is determined in step S16 whether a present duty ratio becomes larger than a duty ratio a determination whether the present duty ratio is equal to or less than the duty ratio maximum value as a result that the duty ratio is increased/decreased by a predetermined value.

On the contrary, although the duty ratio is increased/decreased stepwise in the first embodiment, the increase/decrease amount of the duty ratio may be modified so as to be determined in response to the difference between the output voltage Vout and the target voltage Vref as in the second embodiment.

Figure 8:
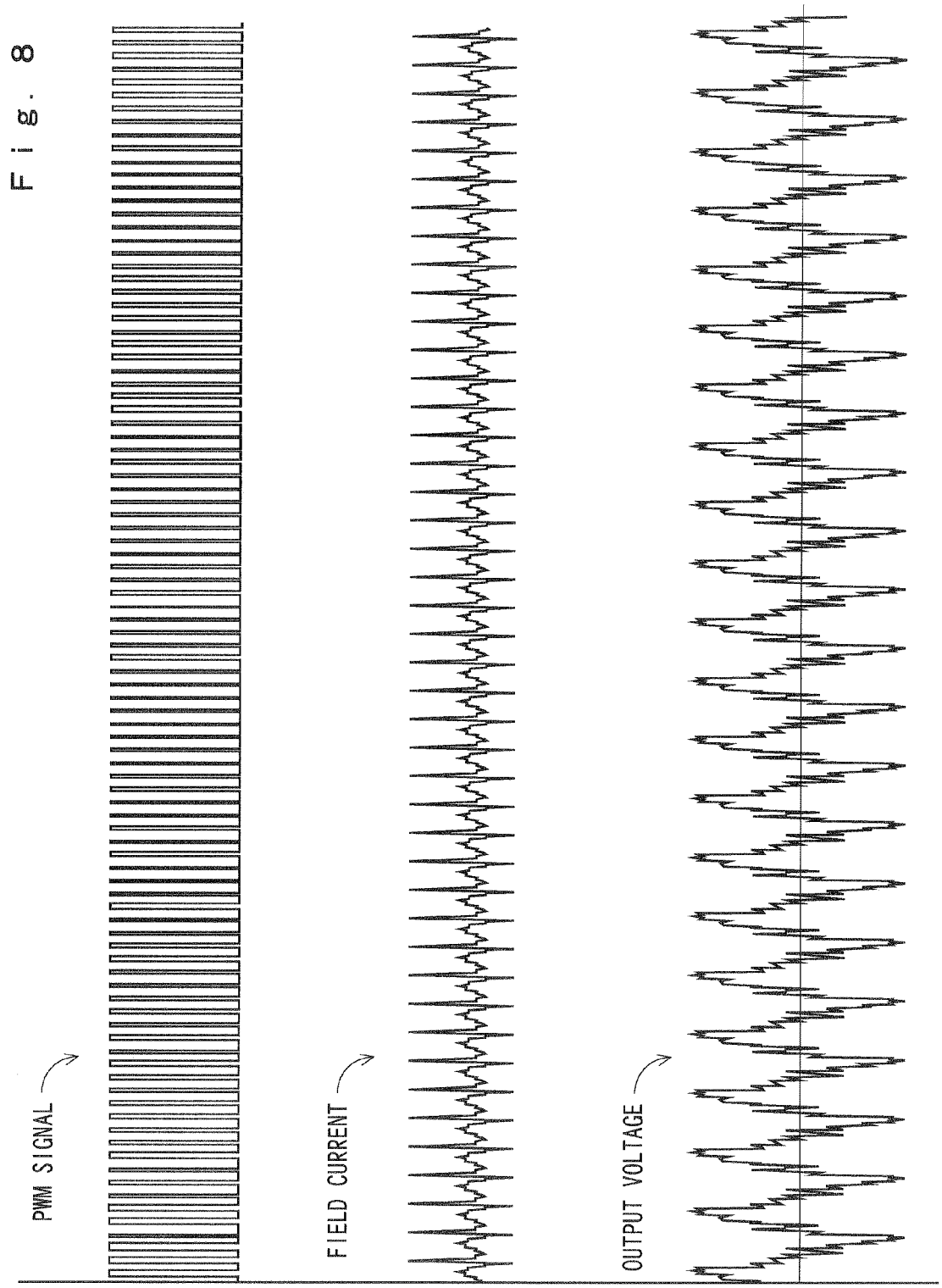
FIG. 8 is a view showing a correspondence between a field current drive PWM signal, which is controlled by an output voltage control apparatus of the embodiment, and a field current corresponding to the field current drive PWM signal and a generator output voltage.
Figure 9:
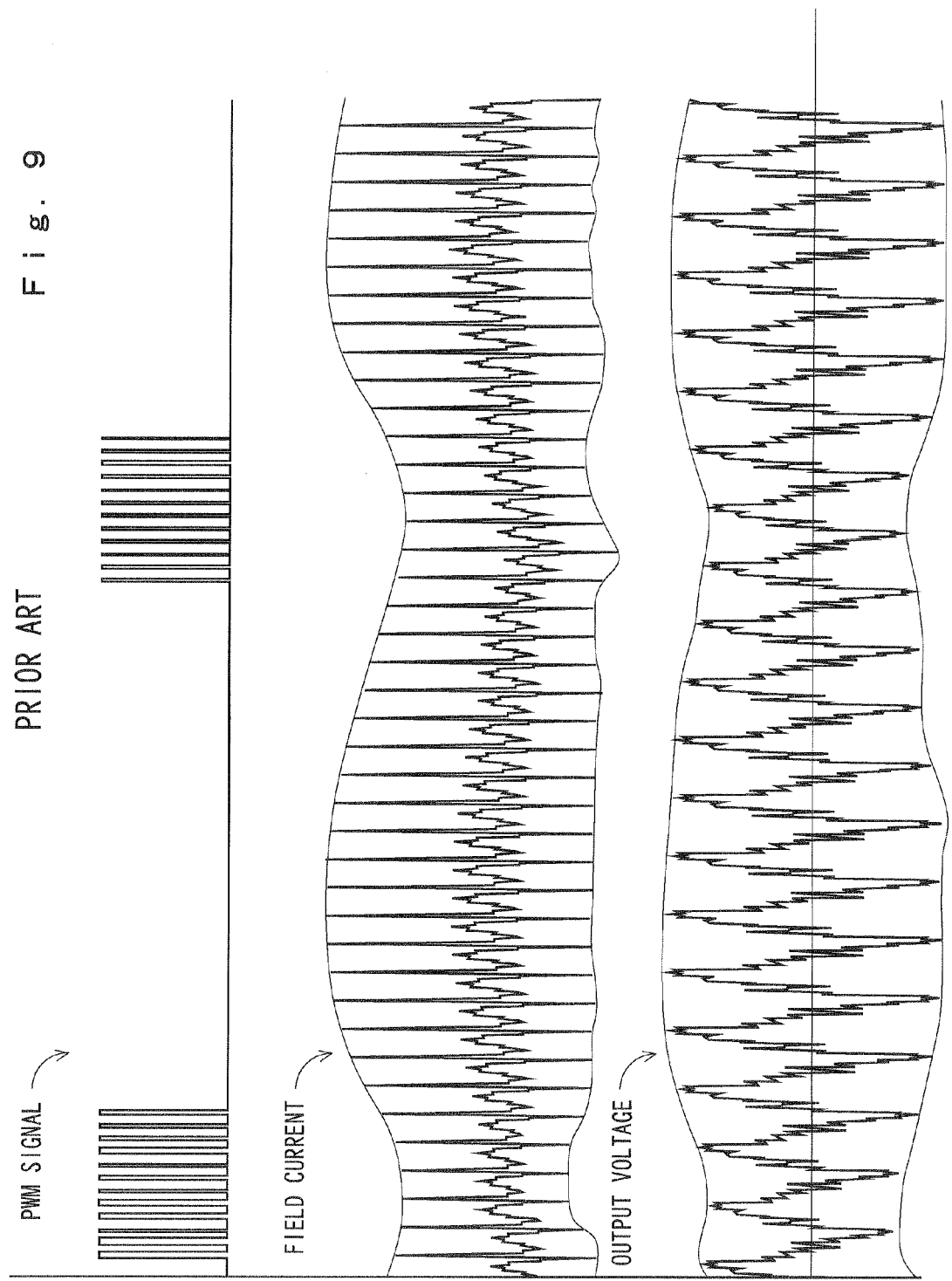
FIG. 9 is a view showing a correspondence of a field current drive PWM signal, and a field current and an output voltage of a generator which correspond to the field current drive PWM signal which is controlled by a prior art.

FIG. 8 is a schematic view showing a correspondence of a field current drive PWM signal, which is controlled by the output voltage control apparatus of the embodiment, and a field current and an output voltage of a generator which correspond to the field current drive PWM signal. FIG. 9 shows a correspondence of a field current drive PWM signal, which is controlled by a conventional technique, and a field current and an output voltage of a generator which correspond to the field current drive PWM signal to compare the prior art with the embodiment.

In the prior art shown in FIG. 9, an intermittent operation with a long period of a duty ratio being zero is executed by a PWM control around duty ratio being 0%. As a result, the field current is not stabilized as apparent from an envelope and thus an amplitude of the output voltage is largely varied. In contrast, according to the embodiment, it can be found that the PWM signal has a short and uniform period of the zero % duty ratio and the intermittent operation disappears as shown in FIG. 8. That is, the field current is continuously controlled by the PWM signal, and the output voltage of the generator has a stable amplitude.

REFERENCE SIGNS LIST

1, 10 . . . phase advance load state discrimination unit,
2 . . . duty ratio zero determination unit,
3 . . . duty ratio zero continuation determination unit,
4 . . . duty ratio increase amount restriction unit,
5 . . . capacitor voltage detection unit,
6 . . . duty ratio maximum value setting unit,
20 . . . voltage difference detector,
21 . . . duty ratio increase/decrease unit,
21*a* . . . duty ratio restriction unit,
100 . . . generator,
102 . . . field winding,
103 . . . generator winding,
104 . . . excitation winding,
107 . . . AVR,
109, 109*a* . . . voltage detection circuit,
110 . . . transistor (switching device),
113 . . . smoothing capacitor

The invention claimed is:

1. An output control apparatus of a generator including a generator winding and an excitation winding wound around a stator, a field winding wound around a rotor rotated by a drive source, and a rectifier for rectifying a current generated by the excitation winding and supplying the rectified current to the field winding, the output control apparatus of a generator, comprising:
a field current control unit which increases/decreases an energization current of the field winding by increasing/decreasing an energization time ratio in an energization cycle of a switching device for controlling an energization of the field winding to converge an output voltage of the generator winding to a target voltage value;
an energization time ratio zero detection unit which detects whether the energization time ratio include a zero; and
an energization time ratio restriction unit which restricts an upper limit value of the energization time ratio at a time when a field current in the field current control unit increases to a predetermined upper limit value when the energization time ratio zero detection unit detects that the energization time ratio includes the zero.

2. The output control apparatus of a generator according to claim 1, comprising an energization time ratio zero continuation determination unit which drives the energization time ratio restriction unit when a time during which the energization time ratio includes the zero is continued for a predetermined time or longer.

3. An output control apparatus of a generator including a generator winding and an excitation winding wound around a stator, a field winding wound around a rotor rotated by a drive source, and a rectifier for rectifying a current generated by the excitation winding and supplying the rectified current to the field winding, the output control apparatus of a generator, comprising:

a smoothing capacitor disposed in parallel with the field winding;

a field current control unit which increases/decreases an energization current of the field winding by increasing/decreasing an energization time ratio in an energization cycle of a switching device for controlling an energization of the field winding to converge an output voltage of the generator winding to a predetermined voltage value;

a capacitor voltage detection unit which detects a terminal voltage of the smoothing capacitor; and an energization time ratio restriction unit which restricts an upper limit value of an energization time ratio by a maximum value determined so that the energization time ratio is made smaller when a capacitor voltage is higher corresponding to the capacitor voltage detected by the capacitor voltage detection unit when a field current is increased by the field current control unit.

* * * * *